Dec. 7, 1926.
J. F. O'CONNOR
1,609,302
FRICTION SHOCK ABSORBING MECHANISM
Filed April 23, 1925        2 Sheets-Sheet 1
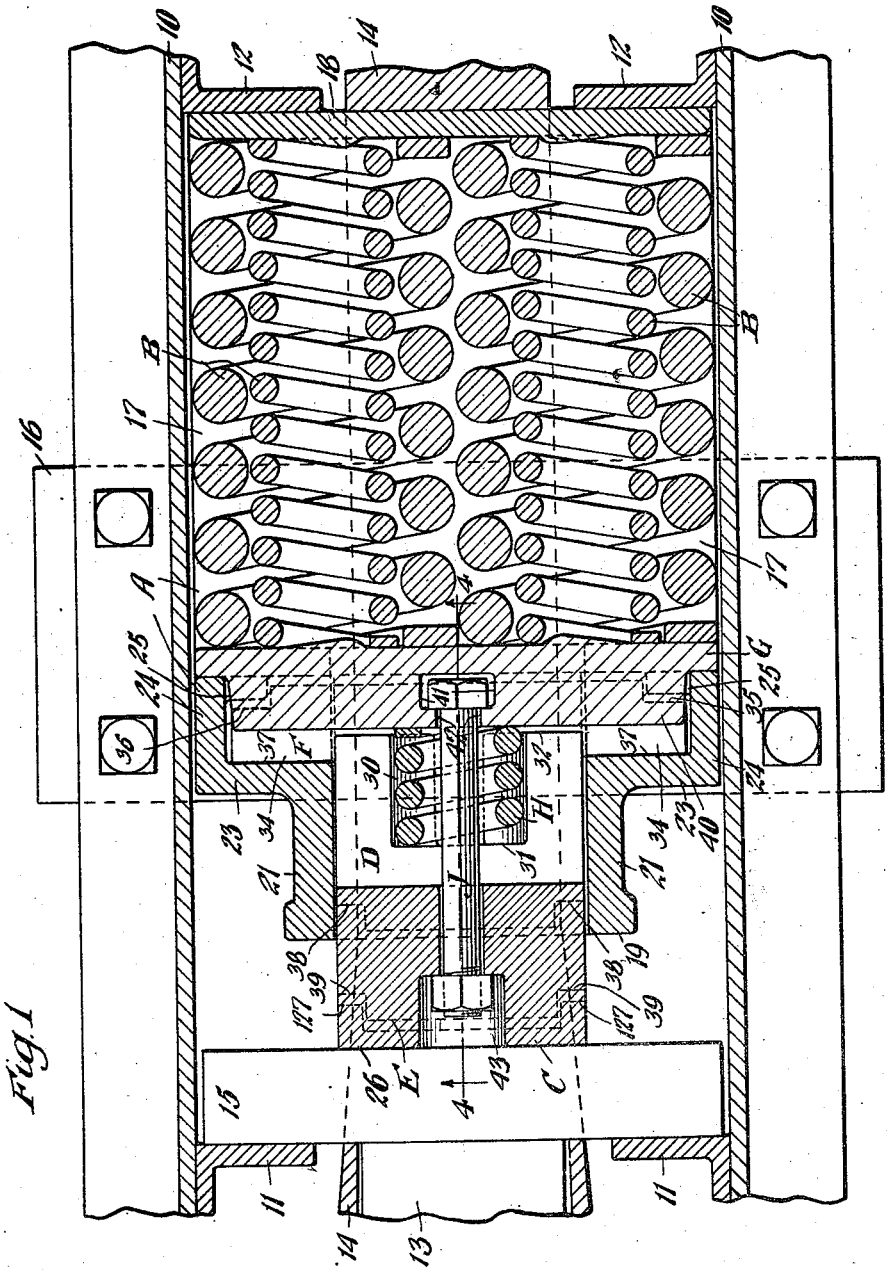

Dec. 7, 1926. 1,609,302
J. F. O'CONNOR
FRICTION SHOCK ABSORBING MECHANISM
Filed April 23, 1925  2 Sheets-Sheet 2
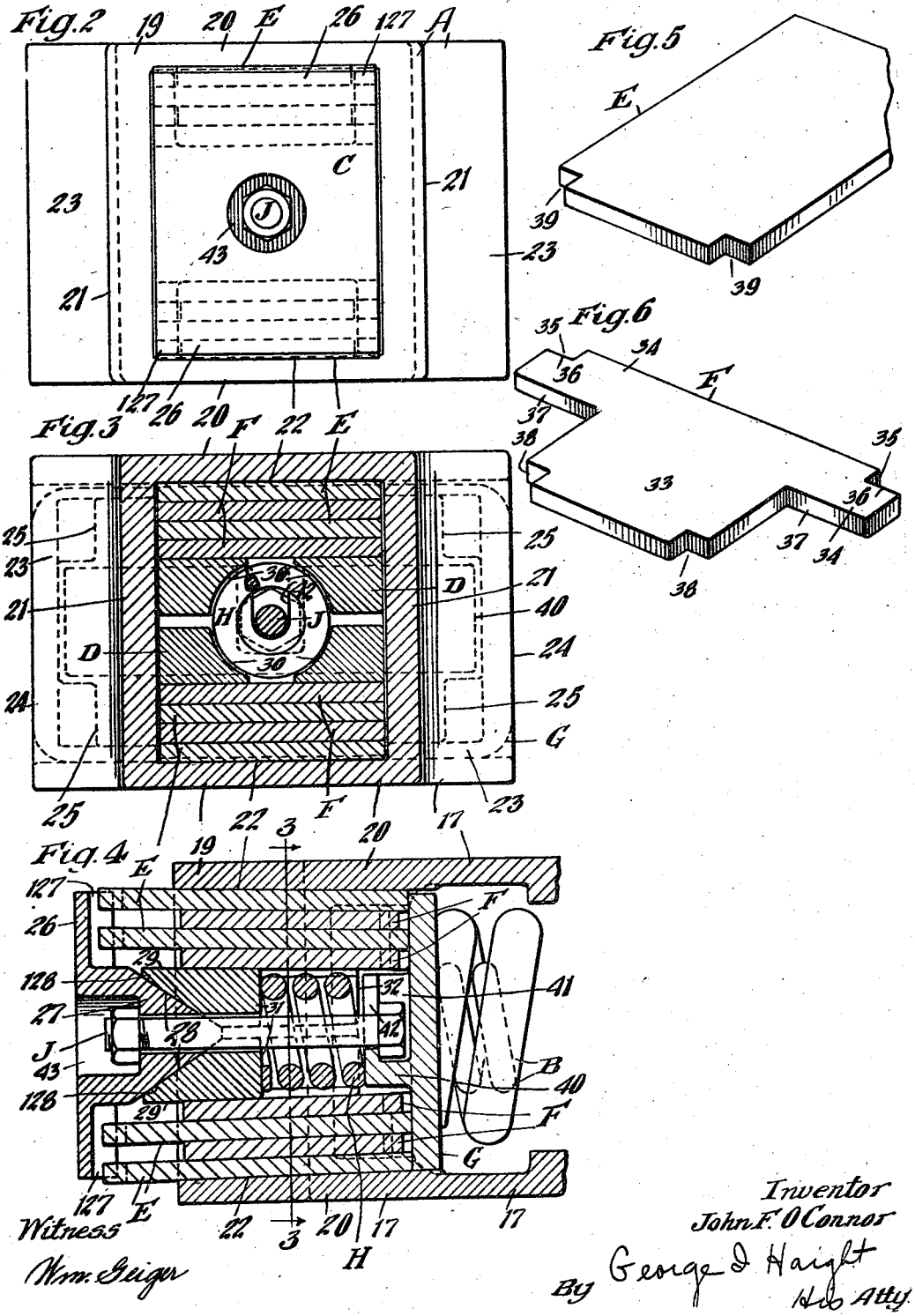

Patented Dec. 7, 1926.

1,609,302

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed April 23, 1925. Serial No. 25,214.

This invention relates to improvements in friction shock absorbing mechanisms.

One object of the invention is to provide a friction shock absorbing mechanism, especially adapted for railway draft riggings, having high capacity combined with graduated action, and initial, relatively light resistance to absorb the lighter shocks, wherein a plurality of relatively movable friction plates are employed to produce a final heavy frictional resistance, the plates being bodily movable in unison during one of the stages of the graduated action during a predetermined portion of the compression stroke.

Another object of the invention is to provide a mechanism of the character indicated, including a friction shell; wedge spreading means; twin arranged main spring resistance elements; a preliminary spring resistance element; and a plurality of intercalated friction plates movable in unison with reference to the shell during a predetermined compression of the mechanism, means being provided to arrest movement of certain of the plates after the predetermined compression of the mechanism, to compel relative movement of said intercalated plates to effect heavy frictional resistance during the remainder of the compression stroke.

Other objects and advantages of the invention will more fully and clearly appear from the description and claims hereinafter following.

In the drawing forming a part of this specification, Figure 1 is a longitudinal, horizontal, sectional view of a portion of a railway draft rigging, showing my improvements in connection therewith. Figure 2 is a front end elevational view of the shock absorbing mechanism proper. Figure 3 is a vertical, transverse, sectional view corresponding substantially to the line 3—3 of Figure 4. Figure 4 is a vertical, longitudinal, sectional view at the front end of the shock absorbing mechanism, corresponding substantially to the line 4—4 of Figure 1. And Figures 5 and 6 are detailed, perspective views respectively of two of the friction plates employed in connection with my improved mechanism.

In said drawings, 10—10 indicate channel-shaped center or draft sills of a railway car underframe, to the inner faces of which are secured front stop lugs 11—11 and rear stop lugs 12—12. The inner end portion of the drawbar is designated by 13, to which is operatively connected a hooded yoke 14 of well-known form. The shock absorbing mechanism proper, as well as the front main follower 15 are disposed within the yoke. The yoke and the parts therewithin are operatively supported by a detachable saddle plate 16 fixed to the respective draft sills.

The improved shock absorbing mechanism proper, as shown, comprises broadly, a combined spring cage and friction shell casting A; twin arranged main spring resistance elements B—B; a main wedge C; two friction wedge shoes D—D; two sets of friction plates E and F; a spring follower G; a preliminary spring resistance H; and a retainer bolt J.

The combined friction shell and spring cage casting is of generally rectangular box-like form, having spaced top and bottom walls 17—17, and a transverse end wall 18 adapted to co-operate with the stop lugs 12 in the manner of the usual rear follower. At the forward end, the casting A is of reduced width providing a rectangular friction shell section 19, having horizontally disposed spaced top and bottom walls 20—20 and vertically disposed spaced side walls 21—21. The top and bottom walls 20—20 of the friction shell present opposed, interior, rearwardly converging friction surfaces 22—22. The top and bottom walls 20—20 of the friction shell section form continuations of the top and bottom walls of the casting A. The spring cage section of the casting A also has transversely alined short end walls 23—23 and relatively short side walls 24—24 at the forward end thereof, the casting being left open at the opposite sides between the walls 24 and the end wall 18 to permit the assembling of the parts of the mechanism therewithin. Each side wall 24 of the spring cage is provided with a pair of vertically alined ribs 25 at the rear end thereof, the ribs being disposed adjacent the top and bottom of the mechanism, a space being left centrally therebetween as most clearly shown in Figure 4.

The wedge C is in the form of a casting having a transversely disposed plate-like section 26 provided with a central enlargement 27 projecting rearwardly therefrom and extending from the top to the bottom thereof, providing the wedge proper. At the opposite sides, the plate-like section 26 has a pair of vertically disposed flanges 127. The main wedge portion 27 has a pair of inwardly converging wedge faces 28 at the inner end, the wedge faces being disposed at opposite sides thereof.

The friction wedge shoes D, which are two in number, are of like construction. Each shoe D has a longitudinally disposed flat side face 29 forming a friction surface on the outer side thereof. On the inner side, each shoe D has an outerwedge face 128 correspondingly inclined to and adapted to co-operate with the corresponding wedge face 28 of the wedge 27. As most clearly shown in Figures 1 and 4, the shoes are arranged above and below the longitudinal axis of the mechanism. Each of the shoes is recessed at the inner end as indicated at 30 to accommodate the corresponding side of the preliminary spring H, a transverse abutment face 31 being formed at the front end of the recessed portion 30 to provide bearing for the outer end of the spring H. The rear end of each shoe is provided with a flat transverse abutment face 32 adapted to co-operate with the spring follower G as hereinafter more fully described.

The friction plates E and F are arranged in two groups at the top and bottom of the mechanism, each group being interposed between the corresponding wedge shoe D and the adjacent friction surface of the shell. As most clearly shown in Figures 3 and 4, the friction plates of each group are four in number, there being two plates F and two plates E. The plates F of each group are of like construction, each plate F comprising a main body portion 33 provided with laterally extending arms 34 at the rear end thereof. Each of the arms is notched at the outer end thereof as indicated at 35, presenting transverse abutment faces 36 adapted to co-operate with the corresponding ribs 25 of the spring cage to limit the inward movement of the plate. The front edges of the arms 34 present transverse abutment faces 37—37 adapted to co-operate with the inner faces of the transverse walls 23 of the spring cage to limit the outward movement of the plates F. At the outer ends, the opposite sides of the plates F are also notched as indicated at 38 to provide clearance for the flanges 27 of the wedge member C when the mechanism is fully compressed.

The plates E which are also of like design, are of generally rectangular outline, being notched at opposite sides at their forward ends as indicated at 39 to accommodate the flanges 27 of the wedge C as most clearly illustrated in Figures 1 and 4. One of the plates E of each group is disposed outermost and co-operates with the corresponding friction surface 22 of the friction shell, while one of the plates F of each group is disposed innermost and co-operates with the friction surface 29 of the corresponding friction wedge shoe. The parts are so proportioned that the distance between the front faces of the ribs 25 and the inner faces of the transverse walls 23 of the spring cage is greater than the width of the corresponding notched section of the arm 34 of the plate F, thereby leaving a clearance between the faces 36 of the arms 34 and the front faces of the ribs 25 in the normal full released position of the parts to provide for a certain amount of movement between the plates F and the casting A.

The spring follower G is in the form of a relatively heavy rectangular plate having a centrally disposed, transversely extending, horizontal enlargement 40 at the forward side thereof, the enlargement being vertically slotted at the center to provide a T-shaped slot, the enlarged portion of the slot being designated by 41 and a relatively narrower portion by 42. The T-shaped slot is left open at the top to permit insertion of the head end of the retainer bolt J. The front face of the enlargement 40 forms an abutment for the inner ends of the friction wedge shoes D, the shoes being normally slightly spaced from the enlargement 40 to provide for preliminary action. At the opposite sides, the enlargement 40 is cut away as was clearly shown in Figure 1, to clear the corresponding side walls 24 of the spring cage, the side portions of the follower G extending therebeyond being adapted to abut the inner ends of the walls 24 to limit outward movement of the follower.

The main spring resistance elements B which preferably comprise twin arranged members, are interposed between the rear wall 18 of the spring cage and the spring follower G. Each member of the twin arranged springs preferably comprises an outer, relatively heavy coil and an inner lighter coil.

The preliminary spring A comprises a relatively short coil interposed between the enlargement 40 of the spring follower G and the abutment faces 31 of the friction shoes.

The parts are held in assembled relation by the retainer bolt J, the head portion of which is anchored to the spring follower G, being accommodated within the enlarged portion 41 of the T-shaped slot in the projection 40. The head of the bolt is movably accommodated within an opening 43 of the wedge block C. The shank of the bolt extends through the opening restricted portion 42 of the T-shaped slot in the projection 40 of the spring follower and an alined opening in the wedge block proper, the shoes D being recessed as most clearly shown in Figure 4 to accommodate the corresponding sides of the shank of the bolt.

In assembling the mechanism, the plates F are inserted in the spring cage section through one of the open sides thereof and moved forwardly into the friction shell section while disposed centrally thereof, until the outer ends of the arms 34 clear the ribs 25, whereupon the plates are slid laterally into position with the arms in front of the ribs. The spring follower and main springs B are next placed within the spring cage. The preliminary spring H, friction wedge shoes D, friction plates E and wedge C are then placed in position through the forward end of the friction shell, the bolt J being first engaged within the T-shaped slot in the enlargement of the spring follower G by inserting the same from the top as will be evident upon reference to Figure 4. The bolt is then anchored to the wedge C and so adjusted as to place the preliminary spring H under initial compression with the inner ends of the friction shoes spaced from the projection 40 of the spring follower as clearly illustrated in Figures 1 and 4.

The normal position of the parts is that shown in Figure 1, the plates E bearing on the front face of the spring follower G and having their front ends spaced slightly from the inner surface of the plate-like section 26 of the wedge C. Outward movement of the spring follower G is limited by the inner ends of the walls 24 and the parts are so proportioned that the main springs are held under initial compression by the spring follower. The inner ends of the plates F and the shoulders 36 thereof are normally slightly spaced from the front face of the spring follower G and the front edges of the ribs 25, respectively.

The operation of my improved shock absorbing mechanism, assuming a compression stroke, is as follows: The front follower 15 and the casting A are moved relatively toward each other, carrying the wedge member C inwardly of the spring cage and setting up a wedging action between the wedge and the friction shoes D, spreading the shoes apart and placing the two groups of friction plates under lateral pressure. During the relative movement of the follower 15 and the casting A, the friction shoes will also be forced inwardly of the friction shell, compressing the preliminary spring resistance H. This action will continue until the slight clearance between the shoes and the projection 40 of the spring follower G is taken up, whereupon the spring follower G will be carried inwardly of the spring cage in unison with the wedge and wedge friction shoes, compressing the main spring resistance elements B. The friction plates being under lateral pressure and in frictional engagement with each other and the friction shoes D, there will be a tendency for the same to move inwardly in unison with the friction shoes until the clearance between the outer ends of the lateral arms 34 and the ribs 25 of the spring cage is taken up, whereupon movement of the plates F will be arrested and the wedge friction shoes D forced to slide relatively to the innermost friction plates F. This relative movement will continue until the clearance between the outer ends of the plates E and the plate-like section of the wedge C is taken up, whereupon the plates E will be forced inwardly of the mechanism relatively to the plates F, greatly augmenting the frictional resistance offered. It will be evident that during the time that the wedge C is moving relatively to the plates E, the follower G will be carried away from the inner ends of the plates and that this clearance between the follower G and the plates E will be maintained during the final portion of the compression stroke. The operation just described will continue until either the actuating force is reduced or the follower 15 comes into abutment with the outer end of the friction shell, whereupon the pressure will be transmitted directly through the casting A to the stop lugs 12 preventing the main springs from being driven solid.

Upon the actuating force being reduced, initial release of the wedging system will be had, due to the spring follower G being spaced from the inner ends of the friction plates E, there being no movement of the friction plates until the clearance between the inner ends thereof and the follower G has been taken up. Upon engagement of the inner ends of the friction plates E by the follower, the same will be projected outwardly of the shell carrying the plates F therewith, due to the friction existing between the same. The plates F will be carried outwardly in unison with the plates E until the front abutment faces 37 of the arms 34 thereof come into engagement with the transverse walls 23 of the spring cage, whereupon movement of the plates F will be arrested and the plates E forced outwardly with reference to the plates F and restored to the normal position illustrated in Figures 1 and 4.

It will be evident from the preceding description taken in connection with the drawings, that I have provided a high capacity gear having graduated action during the compression stroke. The main spring resistance is compressed in two increasing stages before there is any relative movement of the friction plates to produce high final capacity, the plates of the two groups moving in unison during a portion of the compression stroke while the main springs are being compressed, movement of the plates being arrested after a predetermined compression of said main springs, whereupon the friction wedge system will be forced to slip on the then stationary plates during further compression of the main springs before the plates are forced to move relatively to each other. By providing the graduated action comprising the successively increasing stages of resistance, my gear is particularly adapted for passenger car service, as abrupt and sudden shocks are entirely eliminated due to the blending of the different stages of the compression.

While I have herein shown and described what I now consider the preferred manner of carrying out my invention, the same is merely illustrative, and I contemplate all changes and modifications that come within the scope of the claims appended hereto.

I claim:—

1. In a friction shock absorbing mechanism, the combination with a casing; of a main follower, said follower and casing being relatively movable with reference to each other; a plurality of intercalated friction plates carried by the casing, said intercalated plates being movable as a unit with reference to the casing during a predetermined portion of the compression stroke, certain of said plates having engagement with the casting to limit their movement inwardly of the latter while the remaining plates are adapted to move inwardly relatively to the casing, said last named plates being normally spaced from said follower; wedge-pressure creating means for placing said plates under lateral pressure; and twin arranged main spring resistance elements co-operating with said wedge pressure creating means.

2. In a friction shock absorbing mechanism, the combination with a casing; of a main follower, said follower and casing being relatively movable with reference to each other; a plurality of horizontally disposed friction elements carried by the casing, said elements being movable as a unit with reference to the casing during a predetermined portion of the compression stroke, certain of said elements having engagement with the casing to limit their movement inwardly of the latter while the remaining elements are adapted to move inwardly relatively to the casing, said last named elements being initially spaced from said follower; wedge pressure creating means for placing said elements under lateral pressure; and a main spring resistance co-operating with said wedge pressure creating means.

3. In a friction shock absorbing mechanism, the combination with a casing having a friction shell at the forward end thereof provided with inwardly converging friction surfaces; a main follower, said follower and casing being relatively movable with reference to each other; a plurality of friction plates within the friction shell, said plates being divided into two groups at the top and bottom of the mechanism, cooperating with the friction surfaces of the shell respectively, said plates being movable as a unit with reference to the friction shell during a predetermined portion of the compression stroke, certain of said plates having engagement with the casing to limit their movement inwardly of the friction shell, while the remaining plates are adapted to move inwardly relatively to the friction shell, wedge-pressure creating means interposed between said two groups of plates for placing the same under lateral pressure; and a main spring resistance co-operating with said wedge pressure creating means.

4. In a friction shock absorbing mechanism, the combination with a casing having a friction shell at the forward end thereof provided with interior top and bottom friction surfaces; of a main follower, said follower and casing being relatively movable with reference to each other; two groups of friction plates within said shell, co-operating respectively with the top and bottom friction surfaces of the shell, the plates of each group being intercalated, said groups of plates being movable as a unit with reference to the casing during a predetermined portion of the compression stroke, certain of said plates of each group having engagement with the casing to limit their movement inwardly of the latter while the remaining plates of each group are adapted to move inwardly relatively to the friction shell; wedge-pressure creating means interposed between said two groups of plates for placing the same under lateral pressure; a spring follower; a main spring interposed between the spring follower and casing; and a preliminary spring interposed between the lateral pressure creating means and the main spring follower.

5. In a friction shock absorbing mechanism, the combination with a casing having a rectangular friction shell at the forward end thereof, said shell being of lesser width than the remainder of the casing, providing lateral shoulders, said casing having abutment means spaced rearwardly from said shoulders; of a main follower, said follower and casing being relatively movable with reference to each other; two groups of friction plates within the friction shell and co-operating with the friction surfaces thereof respectively, said two groups of plates being movable as a unit with reference to the casing during a predetermined portion of the compression stroke, certain of said plates of each group having lugs co-operating with the transverse shoulders and abutment faces of the casing to limit the relative movement of said last named plates and casing, the remaining plates of said two groups being adapted to move rearwardly relative to the casing upon movement of said first named plates being limited; wedge-pressure-creating means for placing said plates under lateral pressure; and main spring resistance elements co-operating with said wedge pressure creating means.

6. In a friction shock absorbing mechanism, the combination with a casing including a spring cage section and a friction shell at the outer end thereof; of a main follower, said main follower and casing being relatively movable with reference to each other; a plurality of intercalated friction plates carried by said casing, certain of said plates having a predetermined amount of limited movement with reference to the casing to provide for preliminary action, said last named plates and said casing having co-operating movement-limited abutment shoulders, the remaining plates being movable relatively to said first named plates, said last named plates being initially spaced from said follower; wedge-pressure creating means for placing said plates under lateral pressure, said means including a main wedge and friction wedge shoes frictionally co-operating with said plates; and main spring resistance means co-operating with said shoes.

7. In a friction shock absorbing mechanism, the combination with a casing having a friction shell at the forward end thereof; of a main follower, said follower and casing being relatively movable toward and from each other; a plurality of intercalated friction plates within said friction shell, said plates being divided into two groups co-operating with opposed walls of the friction shell, said groups of plates being movable as a unit with reference to the casing during a predetermined portion of the compression stroke, certain of said plates having engagement with the casing to limit their movement inwardly of the latter, while the remaining plates are adapted to move inwardly relatively to the casing; a main wedge; a pair of wedge friction shoes co-operating therewith, said shoes being interposed between the two groups of plates; a spring follower normally spaced from the inner ends of the friction shoes; a main spring resistance co-operating with said follower; and a preliminary spring interposed between said shoes and spring follower.

8. In a friction shock absorbing mechanism, the combination with a casing having a friction shell at the forward end thereof, provided with top and bottom friction surfaces, of two groups of friction plates co-operating respectively with said top and bottom friction surfaces, the plates of each group being intercalated, said two groups of plates being movable as a unit with reference to the casing during a predetermined portion of the compression stroke, certain of said plates having engagement with the casing to limit their movement inwardly of the latter, while the remaining plates are adapted to move inwardly relatively to the casing; a main wedge member having abutment surfaces normally spaced from the outer ends of said last named plates; wedge friction shoes interposed between the wedge and the two groups of friction plates; a spring follower normally spaced from the inner ends of said shoes; a main spring resistance co-operating with said follower; and a preliminary spring interposed between said shoes and said spring follower.

9. In a friction shock absorbing mechanism, the combination with front and rear main stops; of a combined spring cage and friction shell co-operating with certain of said stops; a main follower co-operating with the remaining stops; a yoke within which said main follower and spring cage are disposed; a plurality of intercalated friction plates carried by the casing, said intercalated plates being movable as a unit with reference to the casing during a predetermined portion of the compression stroke, certain of said plates having engagement with the casing to limit their movement inwardly of the latter, while the remaining plates are adapted to move inwardly relatively to the casing, said last named plates being initially spaced from said follower; wedge-pressure creating means for placing said plates under lateral pressure; and main spring resistance elements co-operating with said wedge-pressure creating means.

In witness that I claim the foregoing I have hereunto subscribed my name this 21st day of April 1925.

JOHN F. O'CONNOR.